US004001782B2

United States Statutory Invention Registration [19]

[11] Reg. Number: H1782

Wicks et al.

[45] Published: Feb. 2, 1999

[54] PRESCRIPTION MEDICATION NOTIFICATION SYSTEM

[76] Inventors: James Edward Wicks, c/o Sony Electronics, Inc., 1 Sony Dr., Park Ridge, N.J. 07656; Michael S. Lang, c/o Sony Electronics, Inc., Wireless Telecommunications Co., 16450 W. Bernardo Dr., San Diego, Calif. 92127

[21] Appl. No.: 582,934

[22] Filed: Jan. 4, 1996

[51] Int. Cl.[6] ..... G08B 1/08

[52] U.S. Cl. ..... 340/825.44; 340/825.06; 340/286.07; 340/309.15; 379/37

[58] Field of Search ..... 340/825.44, 825.06, 340/286.07, 309.15; 455/38.1; 379/37; 368/4, 13

[56] References Cited

U.S. PATENT DOCUMENTS

| | | | |
|---|---|---|---|
| 4,811,379 | 3/1989 | Grandfield | 340/825.44 |
| 4,845,491 | 7/1989 | Fascenda et al. | 340/825.44 |
| 5,122,795 | 6/1992 | Cubley et al. | 340/825.44 |
| 5,257,307 | 10/1993 | Ise | 340/825.44 |
| 5,335,246 | 8/1994 | Yokev et al. | 340/825.44 |
| 5,623,242 | 4/1997 | Dawson et al. | 340/825.44 |
| 5,657,236 | 8/1997 | Conkright | 340/825.44 |

*Primary Examiner*—Bernarr E. Gregory

[57] ABSTRACT

A medication notification system uses a wireless paging receiver to alert a patient concerning the time or times a specific medication is to be taken. The pharmacy filling the original prescription provides the relevant information as to kind of medication, dosage, and frequency to the paging dispatch center at the time the prescription is filled. This data is stored at the paging dispatch center and automatically transmitted to the paging receiver at the appropriate time. A two-way system is also provided in which, in addition to receiving the instructions relating to taking medication, the patient can transmit health-related information back to his or her health care provider.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRESCRIPTION MEDICATION NOTIFICATION SYSTEM

BACKGROUND OF THE INVENTION

1. Field of the Invention

This invention relates generally to a wireless pager system and, more particularly, to a system for employing a wireless pager in providing information concerning medication to a pager subscriber.

2. Description of Background

With the advent of medical research and the proliferation of an increasing number of drugs available for treating illnesses, it is frequently the case that an individual is required to take a number of different medications at varying times of the day, not to mention with a specified frequency over a typical week. Thus, it is necessary for the patient to individually keep track of the medication that he or she must receive and also to maintain some log so that the times for taking the medication can be followed. Moreover, the timing of taking the medication, vis-a-vis meal times and the like, is frequently a critical factor in the effectiveness of the medication.

Exacerbating this proliferation of medications is the fact that frequently it is older patients who are required to take a large number of drugs, and it is frequently older patients who have more difficulty in keeping track of complicated time schedules.

One solution to this problem of properly taking various medications at the correct times is to provide a multi-segmented or compartmentalized pill case that may include a manually settable index to indicate which pills are to be in which compartment and also a manually settable scheduling device to indicate at which time the pills are to be taken.

The above-mentioned mechanical solutions to this problem of properly taking medication according to a rigorous schedule depends substantially on the reliability of the actual user of the medication. That is, the user must load the multicompartment pill box and properly set whatever indexes and scheduling devices are available.

OBJECTS AND SUMMARY OF THE INVENTION

Accordingly, it is an object of the present invention to provide a prescription medication notification system that can eliminate the above-noted defects inherent in the previously proposed systems.

Another object of this invention is to provide a paging receiver that alerts the patient to the proper times to take the medication, as well as identifying the particular medication to be taken.

In accordance with an aspect of the present invention, a wireless paging receiver worn by a patient is automatically called by a paging dispatch center, alerts the patient with an audible or visible signal, and displays a message indicating the specific medication to be taken at that time.

In accordance with another aspect of the present invention, the paging dispatch center receives information concerning medication and its required scheduling directly from the pharmacy at the time the patient fills the prescription that was written by his or her own doctor. This information is loaded into the storage section of a computer used in the paging dispatch center and, at the appropriate time, the instructional message is transmitted to the paging receiver of the patient.

In accordance with a further aspect of the present invention, a two-way paging system is provided for use by the patient that creates a wireless monitoring system for following the health and nutrition information of the patient, thereby allowing the doctor to track food intake, exercise, and the like and then to remind the patient of the need to "properly" exercise and/or perform other related tasks.

The above and other objects, features, and advantages of the present invention will become apparent from the following detailed description of the illustrative embodiments thereof to be read in conjunction with the accompanying drawings, in which like reference numerals represent the same or similar elements.

DETAILED DESCRIPTION OF PREFERRED EMBODIMENTS

Figure 1:
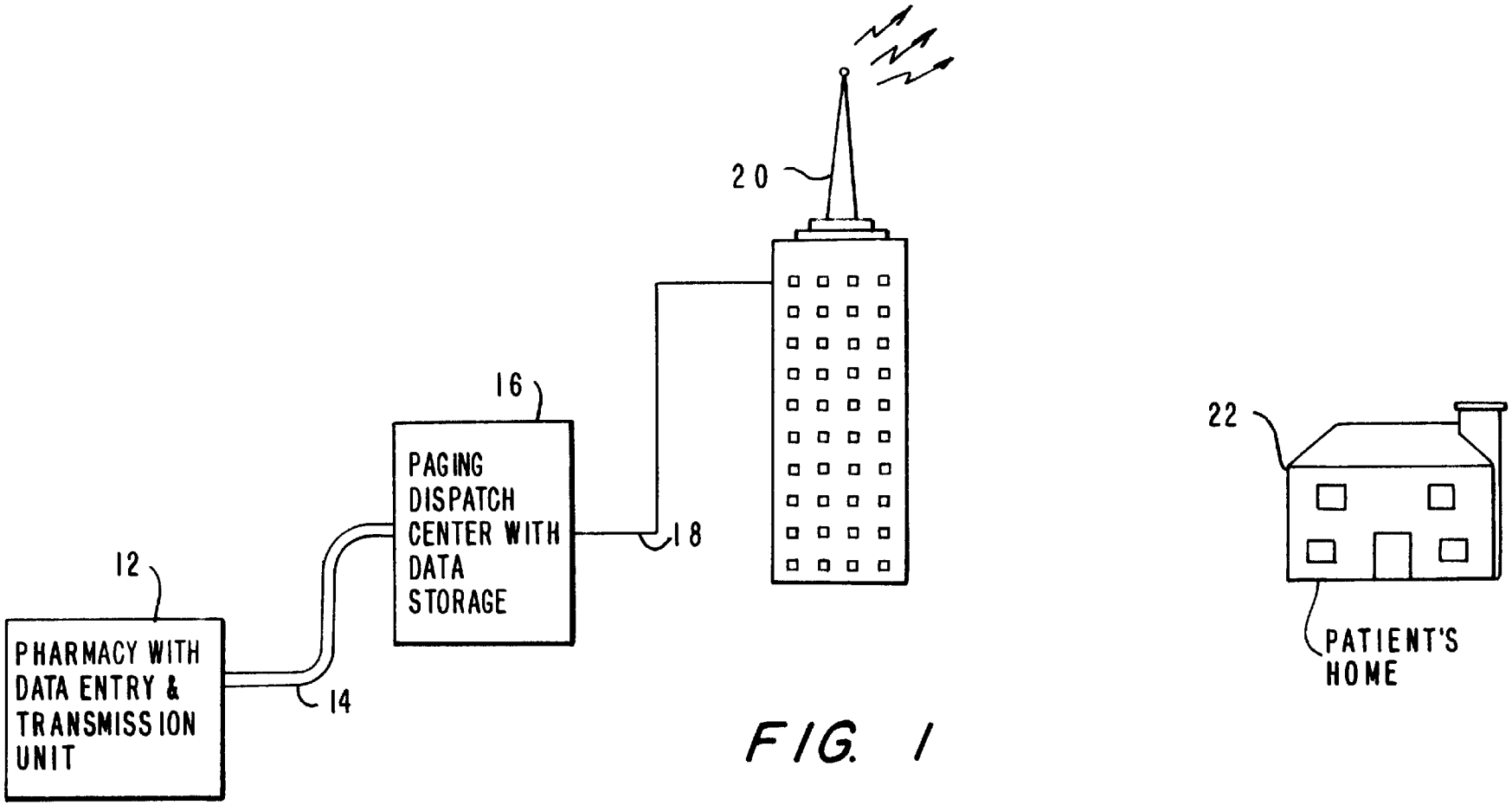
FIG. 1 is a pictorial representation of a prescription medication notification system according to an embodiment of the present invention.

According to a first embodiment of the prescription medication notification system of the present invention shown in FIG. 1, the patient (not shown), following a visit to his or her physician and receiving a prescription for specific medication, visits a pharmacy 12. At the time the prescription is filled, the pharmacist uses a data entry and transmission unit located at the pharmacy 12 and provides the appropriate information concerning the kind of medication and the schedule for taking the medication over existing telephone lines 14 to a paging dispatch center 16 that has been specified by the patient. At the paging dispatch center 16, the incoming medication information is stored in a suitable data storage unit typically found with all personal computing systems, along with the paging number of the paging subscriber, who in this case is also the patient. At the appropriate time the paging dispatch center 16 uses either a signal line 18 or radio waves to send the information to a transmitter 20 to transmit a message via radio waves to the paging receiver (not shown) located at the patient's home 22. This message is transmitted at the time the medication is to be taken and also specifies the particular medication that is to be taken at that time. It is understood, of course, that the patient need not be at his home 22 and that the transmitted message will be received by the paging receiver of the patient as long as the paging receiver is located within the paging coverage area.

Figure 2:
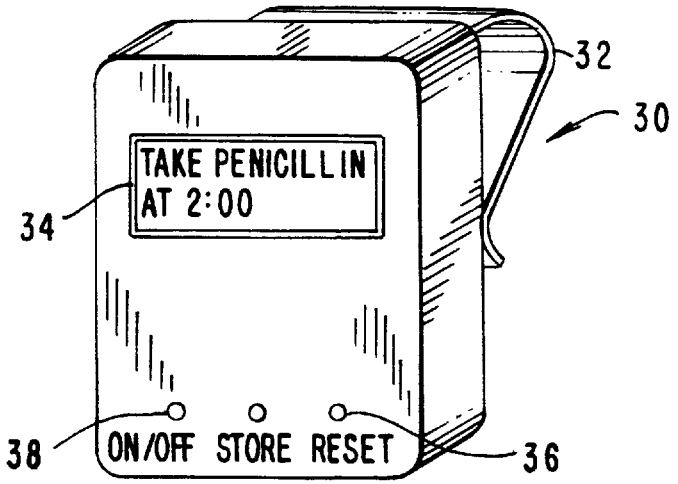
FIG. 2 is a representation of a remote pager according to an embodiment of the present invention.

A paging receiver that might be employed in the embodiment of FIG. 1 is shown in FIG. 2, and such a paging receiver 30 typically has a clip 32 for clipping onto the belt of the patient residing in the edifice 22 but, of course, the patient need not be in his home and could be anywhere and still receive the messages from the transmitter 20. As shown in FIG. 2, a display 34 contains the message that instructs the patientto take a particular medication and in this example, the message on display 34 is "take penicillin." Thus, the patient is alerted by a beep or the like, such as known for use in a conventional paging receiver, and the patient need only read the message to know to take the appropriate medication. In addition to the kind of medication, the dosage could also be set forth in the displayed message.

Subsequently, at different times of the day other messages can be provided or, after a predetermined period of time has elapsed, the same message can be retransmitted to the patient.

The paging receiver 30 can include a reset button 36 if the message is to be removed or an on/off button 33 if the paging/receiver 30 is to be turned off. Of course, the paging receiver 30 need not be dedicated-solely to receiving messages concerning medication, and it, could also be utilized for its conventional purpose, that is, receiving messages for the subscriber regarding making subsequent telephone calls.

Figure 3:
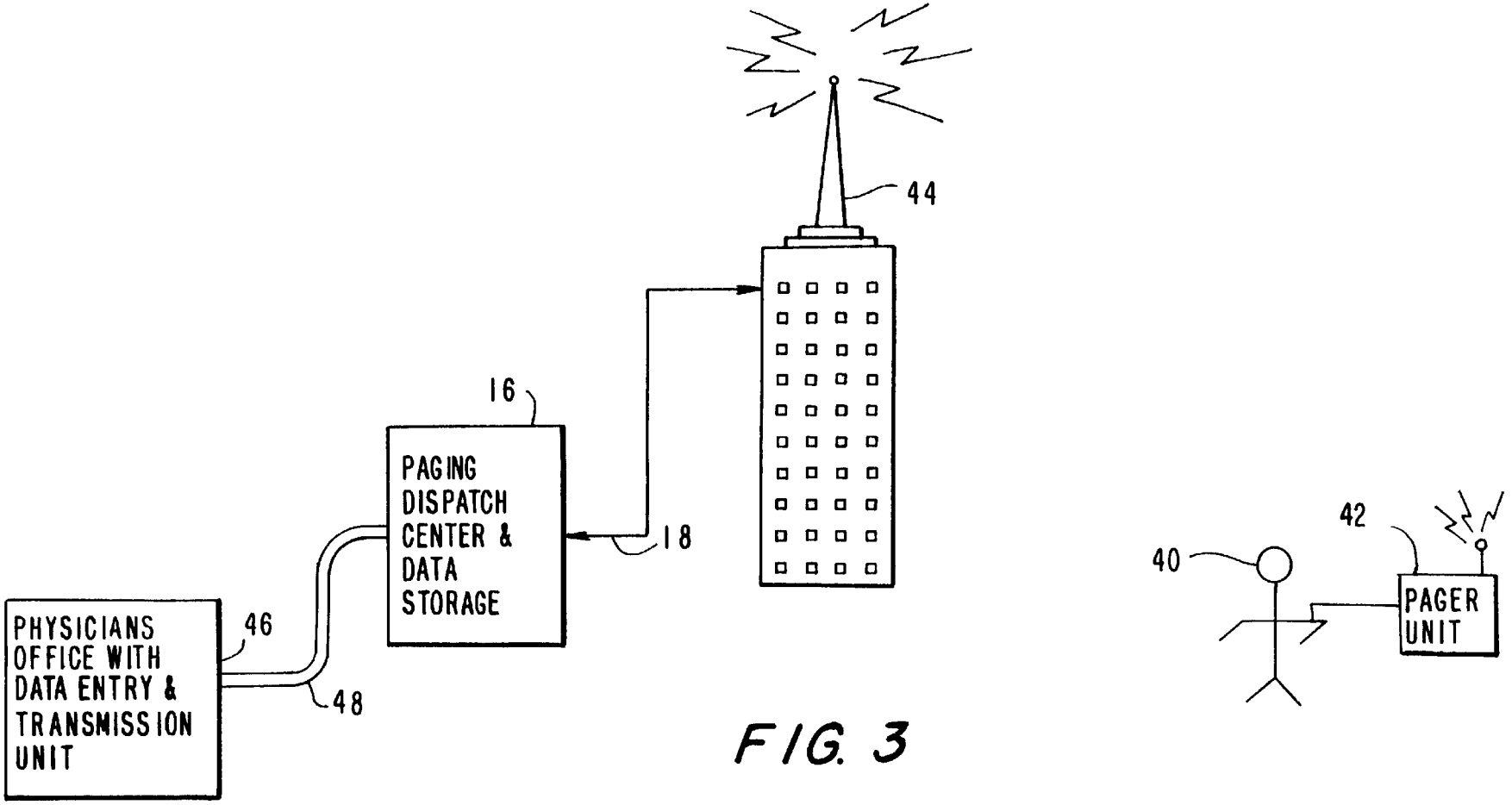
FIG. 3 is a pictorial representation of a prescription notification system according to another embodiment of the present invention.

In the embodiment of the present invention shown in FIG. 3, the patient 40 is provided with a pager 42 that in addition to receiving messages can also transmit messages. Therefore, the patient can provide information to his physician by operating the paging receiver 42 as a transmitter so that the appropriate signals are received at a transmitter/receiver tower 44 and fed over lines 18 to the paging dispatch center 16 that communicates with a physician's office 46 over the telephone lines 48, for example.

Thus, using this two-way paging system of FIG. 3, a wireless monitoring system for tracking the health/nutrition information is provided thereby allowing the physician to track the food intake, exercise, and the like of the patient and to then remind the patient of the need to properly exercise or to have the proper nutrition or the like.

Figure 4:
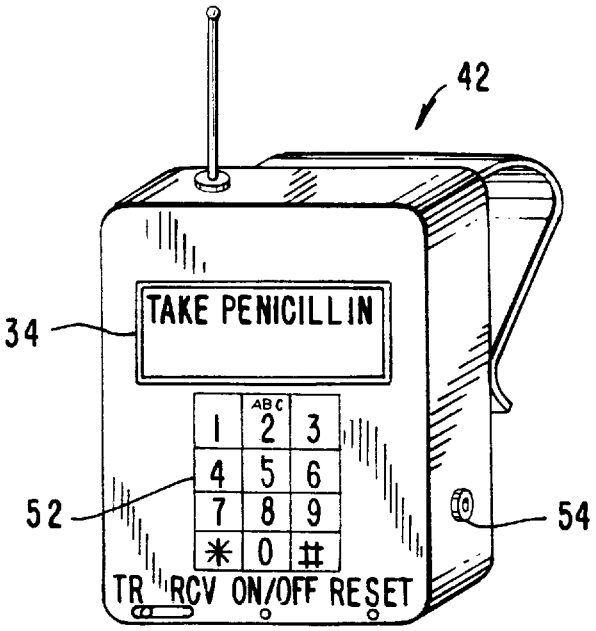
FIG. 4 is a pictorial representation of a remote pager useful in the system of FIG. 3.

The pager 42 useful in the embodiment of FIG. 3 is shown in FIG. 4 in which a keypad 52 is provided for use by the patient for entering and transmitting the appropriate information for the physician or health monitoring facility. In addition, a transducer (not shown) useful in determining heart rate, blood pressure, or the like can be connected to an input jack 54 provided on the two-way remote pager 42 so that medical information can be transmitted using an antenna 56 to the transmitter/receiver tower 44 and the paging dispatch center 16 to the physician's office 46 for analysis. It is then a simple matter for the physician to transmit the appropriate responsive message to the pager receiver 42 utilized by the patient 40.

Of course, it is understood that provisions of the embodiment of FIG. 1 are also inherent in the embodiment of FIG. 3, that is, the medication alert notification is available to the patient using the system of FIG. 3, just as in the embodiment described relative to FIG. 1.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A prescription medication notification system, comprising:

a wireless paging receiver/transmitter having a visual display for displaying a message corresponding to a received signal and having an alphanumeric keypad for use by a patient to input an alphanumeric message for transmission;

a transmitter for sending signals for reception and display by the wireless paging receiver/transmitter;

a paging dispatch center for providing information to the transmitter for subsequent transmission to the wireless paging receiver/transmitter and for receiving the alphanumeric message from the wireless raging receiver/transmitter; and a data entry and transmission unit located at a pharmacy whereat the patient has a medication prescription filled for operation by a pharmacy employee to transmit prescription data to the paging dispatch center, wherein the prescription data includes medication identification data, dosage, and specified future time of day data, so that upon the occurrence of the specified time of day the paging dispatch center automatically causes the transmitter to transmit the medication identification data and the dosage to the wireless paging receiver/transmitter for visual display to the patient.

2. The prescription medication notification system according to claim 1, wherein the paging dispatch center includes data storage means for storing the prescription data from the data entry and transmission unit at the pharmacy.

3. A method for notifying a person to take medication, comprising the steps of:

advising a pharmacist at a pharmacy of prescription medication to be taken by a patient;

transmitting prescription data, dosage, and medication timing data from the pharmacy by a pharmacy employee to a paging dispatch center;

storing the transmitted prescription data, dosage, and medication timing data at the paging dispatch center;

transmitting the stored prescription data and dosage in accordance with the stored medication timing data;

receiving the transmitted stored prescription data at a paging receiver/transmitter located at the same location as the patient;

displaying the received prescription data to the patient using a display on the paging receiver/transmitter; and transmitting an alphanumeric message input by the patient from the paging receiver/transmitter to the paging dispatch center.

4. A medical notification system for a patient, comprising:

a wireless paging receiver/transmitter having a display for displaying received information and an alphanumeric keypad for operation by the patient for entering an alphanumeric message for transmission;

a transmitting and receiving antenna for transmitting information to the wireless paging receiver/transmitter and for receiving the alphanumeric message transmitted by the wireless paging receiver/transmitter;

a paging dispatch center for providing information for transmission by the antenna to the wireless paging receiver/transmitter and for receiving information from the antenna transmitted by the wireless paging receiver/transmitter;

a data entry and data storage means located at an office of the patient's physician and connected to the paging dispatch center for entering prescription medication data including medication identification data, dosage, and specified time of day data for storing in the paging dispatch center, so that upon the occurrence of the specified time of dav the paging dispatch center causes transmission by the antenna of the medication identification data and the dosage to the wireless paging receiver/transmitter for display to the patient, wherein the alphanumeric message entered by the patient using the alphanumeric keypad is transmitted by the wireless paging receiver/transmitter to the paging dispatch center and the paging dispatch center transmits the alphanumeric message entered by the patient to the office of the physician for storage in the data storage means located thereat.

* * * * *